US009050677B2

(12) United States Patent
Kawamoto et al.

(10) Patent No.: US 9,050,677 B2
(45) Date of Patent: Jun. 9, 2015

(54) ARC WELDING METHOD AND ARC WELDING APPARATUS

(75) Inventors: Atsuhiro Kawamoto, Hyogo (JP); Yasushi Mukai, Osaka (JP); Junji Fujiwara, Osaka (JP); Masaru Kowa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 343 days.

(21) Appl. No.: 13/391,061

(22) PCT Filed: Jul. 23, 2010

(86) PCT No.: PCT/JP2010/004711
§ 371 (c)(1),
(2), (4) Date: Feb. 17, 2012

(87) PCT Pub. No.: WO2011/024380
PCT Pub. Date: Mar. 3, 2011

(65) Prior Publication Data
US 2012/0145690 A1    Jun. 14, 2012

(30) Foreign Application Priority Data
Aug. 28, 2009 (JP) ................... 2009-197841

(51) Int. Cl.
*B23K 9/10* (2006.01)
*B23K 9/06* (2006.01)
(Continued)

(52) U.S. Cl.
CPC ............. *B23K 9/073* (2013.01); *B23K 9/067* (2013.01); *B23K 9/0956* (2013.01); *B23K 9/10* (2013.01); *B23K 9/124* (2013.01)

(58) Field of Classification Search
CPC ............... B23K 9/0734; B23K 9/067
USPC ............... 219/137.71, 130.5
See application file for complete search history.

(56) References Cited

U.S. PATENT DOCUMENTS 4,195,216 A * 3/1980 Beauchamp et al. .... 219/121.54
4,283,617 A 8/1981 Merrick et al.
(Continued)

FOREIGN PATENT DOCUMENTS

EP    1676664     7/2006
JP    60102276 A  6/1985
(Continued)

OTHER PUBLICATIONS

International Application Serial No. PCT/JP2010/004711, International Search Report mailed Nov. 2, 2010, 4 pgs.
(Continued)

*Primary Examiner* — Tu B Hoang
*Assistant Examiner* — Alba Rosario-Aponte
(74) *Attorney, Agent, or Firm* — RatnerPrestia

(57) ABSTRACT

An arc welding method comprising the steps of accelerating a feeding speed of a welding wire to cause shorting between the welding wire and a base metal when a welding end signal is input during a period of arcing, retracting the welding wire backward thereafter until a wire retracting speed reaches a predetermined rate, controlling the wire retracting speed constant at this speed for a predetermined duration of time, then stopping the backward retraction of the welding wire, and then terminating a welding power output after supplying a predetermined amount of welding current for a predetermined duration of time starting from a time when opening of the shorting occurs during the backward retraction of the welding wire.

20 Claims, 4 Drawing Sheets

(51) Int. Cl.
  *B23K 9/073* (2006.01)
  *B23K 9/067* (2006.01)
  *B23K 9/095* (2006.01)
  *B23K 9/12* (2006.01)

(56) References Cited

U.S. PATENT DOCUMENTS

| | | | |
|---|---|---|---|
| 4,288,682 A * | 9/1981 | Toth | 219/137.71 |
| 4,780,594 A * | 10/1988 | Rothermel | 219/137.71 |
| 6,023,046 A * | 2/2000 | Holverson et al. | 219/137 PS |
| 6,103,994 A * | 8/2000 | DeCoster et al. | 219/132 |
| 6,627,850 B1 * | 9/2003 | Koga et al. | 219/137.71 |
| 2006/0138115 A1 * | 6/2006 | Norrish et al. | 219/137.71 |
| 2006/0226137 A1 * | 10/2006 | Huismann et al. | 219/137.71 |
| 2008/0156781 A1 * | 7/2008 | Artelsmair et al. | 219/130.5 |
| 2008/0314884 A1 * | 12/2008 | Fujiwara et al. | 219/130.51 |

FOREIGN PATENT DOCUMENTS

| | | |
|---|---|---|
| JP | 60221175 A | 11/1985 |
| JP | 03238171 A | 10/1991 |
| JP | 04111972 A | 4/1992 |
| JP | 04210872 A | 7/1992 |
| JP | 11267828 A | 10/1999 |
| JP | 2000000665 A | 1/2000 |
| JP | 2002292464 A | 10/2002 |

OTHER PUBLICATIONS

The Extended European Search Report dated Apr. 17, 2015 for the related European Patent Application No. 10811439.8.

* cited by examiner

… … …

ARC WELDING METHOD AND ARC WELDING APPARATUS

TECHNICAL FIELD

The present invention relates to an arc welding method and an arc welding apparatus of consumable electrode type used for welding by generating arc between a welding wire serving as a consumable electrode and a base metal as an object to be welded while feeding the welding wire.

BACKGROUND ART

There is a rising demand in recent years in the welder industry for improvement of arc-starting performance in order to increase the productivity by shortening welding time and to obtain high quality in the welding result. One of the methods of shortening the welding time is to reduce a processing time to end the welding. Also useful is to optimize a shape of the tip of the wire at the end of welding, as one of the methods of improving the arc-starting performance. The both methods pertain to control process at the end of the welding.

FIG. 4 is a schematic diagram showing a general structure of a conventional arc welding apparatus. Primary rectifier element 3 rectifies the power input from mains power source 1. Switching element 4 switches an output of primary rectifier element 3 to produce an output suitable for welding. Main power transformer 2 converts the output of switching element 4 into an output suitable for welding. Secondary rectifier element 6 rectifies the output of main power transformer 2. Reactor 5 smoothes the output of secondary rectifier element 6 into a current form suitable for welding. Welding current detector 8 detects a welding current. Welding voltage detector 9 detects a welding voltage. Short/arc detector 10 determines whether welding condition is in a short mode, in which wire 16 and base metal 15 are in contact with and stay shorted, or in an arcing mode, in which they have opened out of the short mode and arc is being generated, according to a welding voltage detector signal. Welding start dictator 35 inputs a welding start signal and a welding end signal to welding power unit 14 from the outside. Welding-end determining section 34 determines an end point of the welding time based on the input from welding start dictator 35. Integrator section 30 computes an integrated amount of welding current, starting from a time immediately after opening of the shorting at the end of welding portion. Threshold value setting section 31 sets a threshold value for comparison with the integrated amount of welding current. Comparator section 32 compares the integrated amount of welding current with the threshold value. Output controller 36 outputs a signal for controlling welding power output. Driver 33 outputs a signal for driving switching element 4 to control the welding power output.

Welding voltage detector 9 is connected across output terminals of welding power unit 14, and outputs a signal corresponding to a detected voltage. Short/arc detector 10 judges based on the signal from welding voltage detector 9 as to whether the welding power output voltage is at least equal to or less than a predetermined value. Using a result of this judgment, short/arc detector 10 determines whether wire 16 is in a short mode by being in contact and shorted with base metal 15 of the object to be welded, or an arcing mode by being not in contact with base metal 15, and it then outputs a determination signal.

FIG. 5 is a graphic representation illustrating waveforms of wire feeding speed Wf, welding voltage Vw and welding current Aw in the conventional method of arc welding.

Referring now to FIG. 4 and FIG. 5, description is provided of the conventional method of controlling the arc welding. When a welding end signal is input from welding start dictator 35 at time T1, welding-end determining section 34 detects a point of time from which to start controlling the end of welding. The wire feeding speed is then decelerated at a predetermined inclination toward a stop. When a change occurs in the detection from the short mode to the arc mode, short/arc detector 10 determines this point as to be time T2 for a globule on the tip end of wire 16 to move to base metal 15. Taking time T2 as a starting point, integrator section 30 starts integrating output current to obtain an integrated value, and comparator section 32 compares this integrated value with the threshold value set by threshold value setting section 31. When the integrated value reaches the threshold value, the output current of a predetermined value set beforehand by output controller 36 is supplied for a predetermined time period t1 to form a globule at the tip end of wire 16, and the welding power output is terminated (refer to patent literature PTL1 for instance).

It becomes possible by the above method to control a shape of the tip end of the wire to have a uniform size without variations at the end of welding, and limit the influence of slag upon starting the subsequent arc, thereby achieving an excellent arc-starting performance.

According to the conventional method of welding control discussed above, it is possible to control the shape of tip end of the wire to be uniform in size without variations. However, when attempted to control and form a globule of a small size (e.g., about 1.1 to 1.3 times the diameter of the wire) on the tip end of wire 16, there are cases wherein a stick or the globule is absorbed into a molten metal pool due to heaving and the like of the molten metal pool, resulting in a failure to form the globule of desired size.

CITATION LIST

Patent Literature

PTL 1: Unexamined Japanese Patent Publication No. 2002-292464

SUMMARY OF THE INVENTION

An arc welding method of the present invention comprises the steps of accelerating a feeding speed of a welding wire to cause shorting between the welding wire and a base metal when a welding end signal is input during a period of arcing, retracting the welding wire backward thereafter until a wire retracting speed reaches a predetermined rate, controlling the wire retracting speed to maintain it constant for a predetermined duration of time, then stopping the backward retraction of the welding wire, and then terminating a welding power output after supplying a predetermined amount of welding current for a predetermined duration of welding time starting from a point of time when opening of the shorting occurs during the backward retraction of the welding wire.

A result of this is to achieve formation of a shape of the tip end of the wire into an optimum size without variations and to obtain a globule of the desired size appropriate for improving arc-starting performance.

DETAILED DESCRIPTION OF PREFERRED EMBODIMENTS

Description is provided hereinafter of exemplary embodiments of the present invention with reference to the accompanying drawings.

First Exemplary Embodiment

Figure 1:
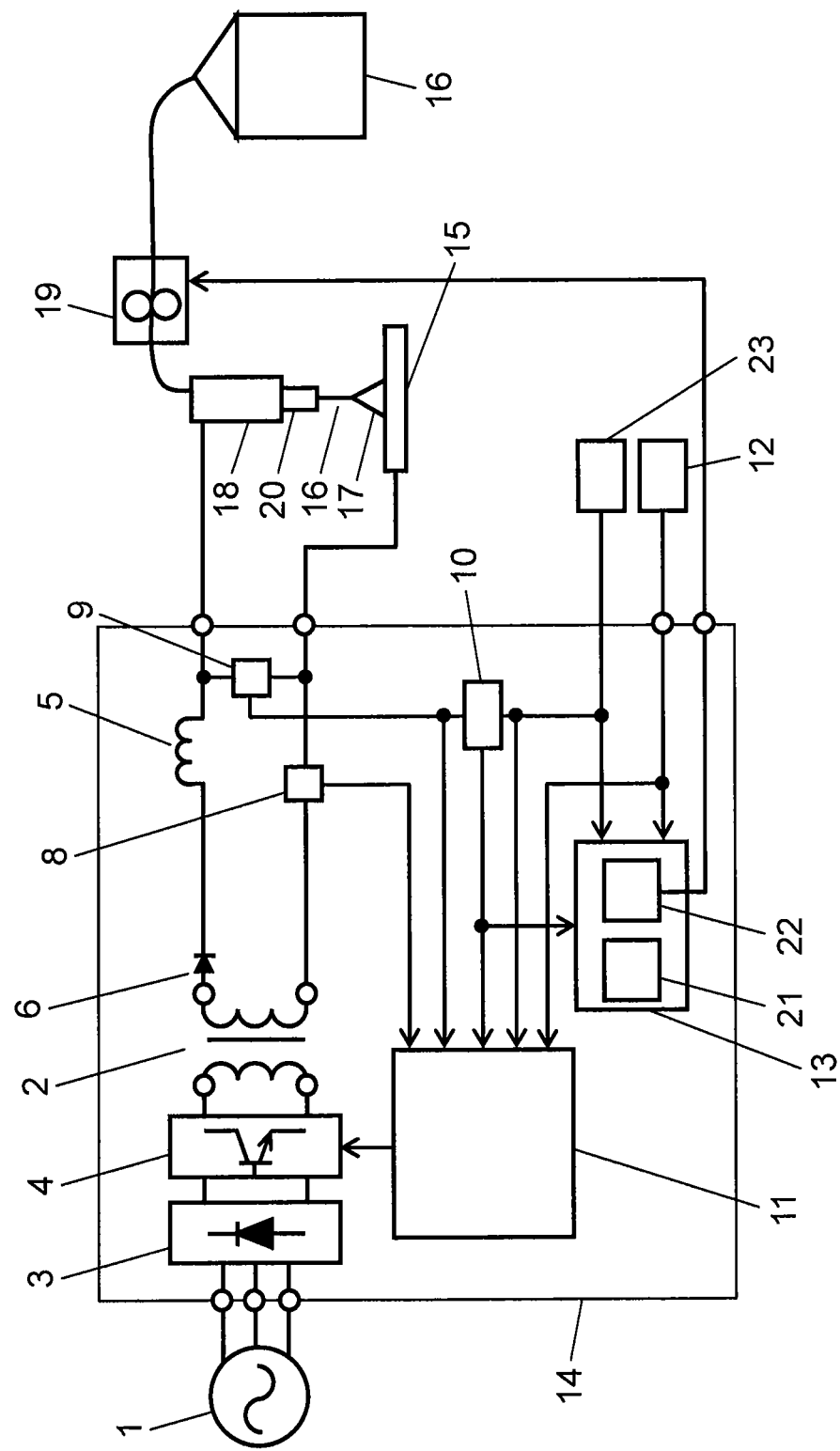
FIG. 1 is a schematic diagram showing a general structure of an arc welding apparatus according to a first exemplary embodiment of the present invention.
Figure 2:
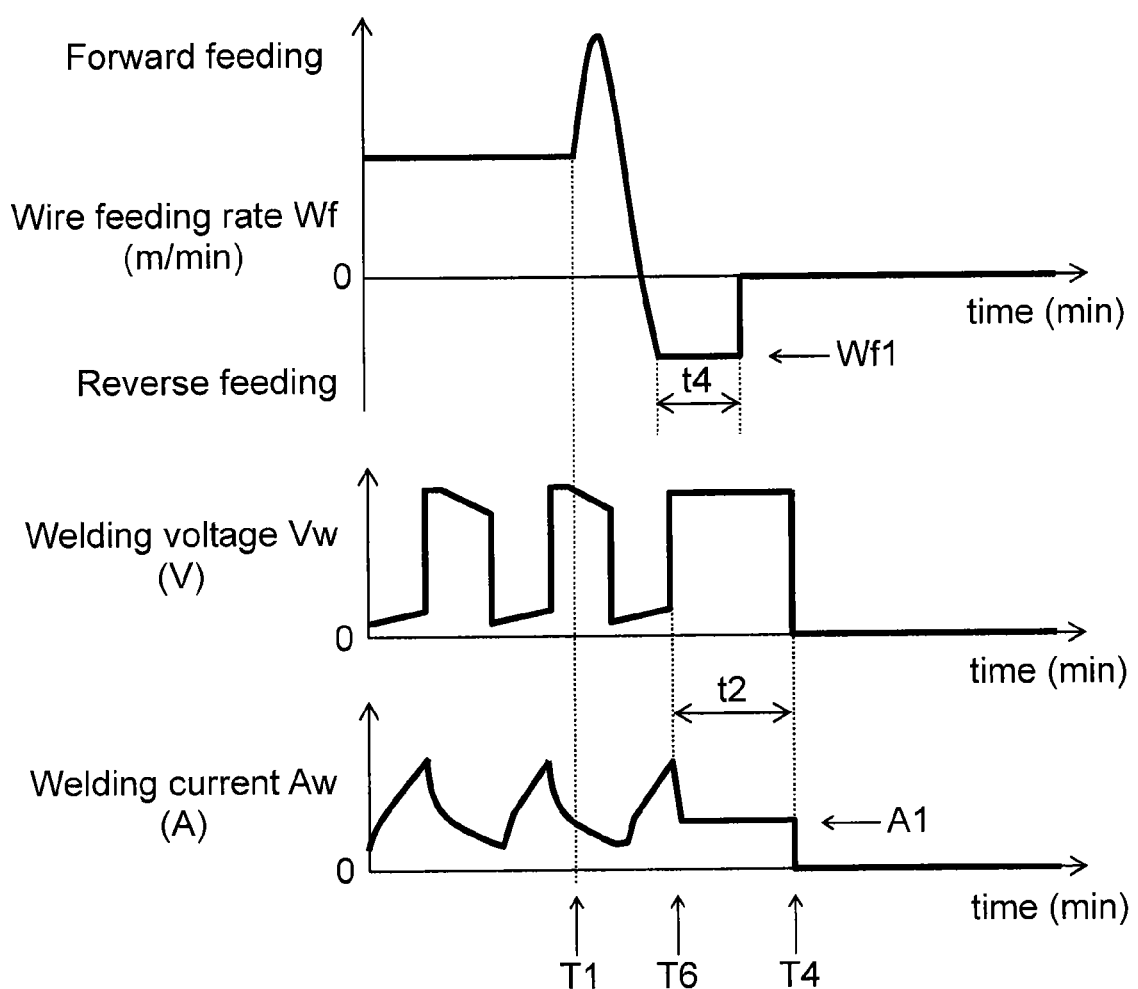
FIG. 2 is a graphic representation illustrating waveforms of wire feeding speed, welding voltage and welding current of the arc welding apparatus.

FIG. 1 is a schematic diagram showing a general structure of an arc welding apparatus according to the first exemplary embodiment of this invention, and FIG. 2 is a graphic representation illustrating waveforms of wire feeding speed, welding voltage and welding current of the arc welding apparatus.

In FIG. 1, primary rectifier element 3 rectifies the power input from mains power source 1. Switching element 4 regulates an output of primary rectifier element 3 to produce an output suitable for welding. Main power transformer 2 converts the output of switching element 4 into an output suitable for welding. Secondary rectifier element 6 rectifies the output of main power transformer 2. Reactor 5 smoothes the output of secondary rectifier element 6 into a current form suitable for welding. Welding current detector 8 detects a welding current. Welding voltage detector 9 detects a welding voltage. Short/arc detector 10 determines whether welding condition is in a short mode, in which wire 16 and base metal 15 are in contact with and stay shorted, or in an arcing mode, in which they have opened out of the short mode and arc is being generated, according to a welding voltage detector signal output from welding voltage detector 9. Here, wire 16 means a welding wire that serves as a consumable electrode, and base metal 15 means an object to be welded.

Output controller 11 controls the welding power output. Welding start dictator 12 gives a command of starting or stopping the welding power output. Wire feeding speed controller 13 controls a wire feeding speed. Tip 20 is mounted to torch 18. Welding condition setting section 23 is used by an operator to set welding conditions such as a welding current and a welding voltage. In other words, output controller 11 controls switching element 4 in a manner to produce any of predetermined current waveform and voltage waveform according to a given electric current set in welding condition setting section 23 and an output of short/arc detector 10.

Typical examples of welding start dictator 12 include a remote controller connected to welding power unit 14 and a torch switch for torch 18. Other examples, in the case of using a welding robot, are a robotic controller and the like having a program stored for operation of the robot.

Examples of welding condition setting section 23 include a remote controller and the like connected to welding power unit 14. A robotic controller having a stored operation program, a teaching pendant connected with the robotic controller, and the like are also examples when a welding robot is used.

FIG. 2 is a graphic representation illustrating waveforms showing changes with time of wire feeding speed Wf, welding voltage Vw, or the output voltage for welding, and welding current Aw, or the output current for welding.

Time T1 shown in FIG. 2 is a time when a signal is input from welding start dictator 12 for turning off the welding power output, and upon which a control process is commenced for wire feeding speed Wf, welding current Aw and welding voltage Vw in order to end the welding. Wire feeding speed Wf is accelerated to predetermined amplitude and cycle (frequency), and decelerated afterwards. A backward retracting control of the wire is hence carried out following the forward feeding control in a manner that, when a backward retracting speed of the wire reaches a predetermined rate Wf1, this retracting speed Wf1 is maintained for a predetermined duration of time t4, and the feeding/retracting speed is changed to 0, or it is stopped upon a lapse of time t4. This forward feeding forcibly makes shorting, and the subsequent backward retraction pulls up and separates wire 16 from base metal 15 to forcibly open the shorting thereafter (time T6). Here, predetermined wire retracting speed Wf1 is roughly 1 m/min to 20 m/min, and predetermined retracting time t4 is roughly 10 msec to 30 msec. Furthermore, predetermined amplitude of wire feeding speed Wf is roughly 2 m/min to 25 m/min, and a predetermined cycle is about 40 to 100 times per second. In other words, the frequency is about 40 Hz to 100 Hz, which correspond to a period of about 10 msec to 25 msec.

When the shorting is opened during the backward retraction, the tip end of wire 16 becomes the smallest in shape without variations since it is the moment immediately after a globule at the tip end of wire 16 is absorbed in a molten metal pool. It is for this reason that a predetermined value of constant welding current A1 is output for a predetermined duration of welding-current time t2 starting from time T6 to control the shape of tip end of wire 16 to become the desired size. The predetermined welding current A1 necessary to melt wire 16 is approximately 30 A to 100 A, and the predetermined duration of welding-current time t2 is between 10 msec and 30 msec, for instance. These predetermined welding current A1 and predetermined duration of welding-current time t2 vary depending on diameter and the like factors of wire 16. A distance between the tip end of the wire and the base metal is set to be about 3 mm to 8 mm taking into account a melted portion of wire 16 added to a distance being pulled back by the backward retraction. Since the tip end of wire 16 is melted while it is in the pulled-back position, a proper distance can be secured between the tip end of the wire and the base metal even when forming the tip end of wire 16 into a small shape. This can prevent the tip end of wire 16 from coming in contact with the molten metal pool and the globule from being absorbed in the molten metal pool after the stick and the welding power output is turned off.

In this first exemplary embodiment, the time to stop the wire feeding speed is shown as not to coincide with the time to terminate the welding power output, as such that the termination of the welding power output is set later than the stop time of the wire feeding speed. However, they can be set to coincide with each other, or the termination of the welding power output may be set earlier than the other without problems, as their relation becomes different depending on the diameter, etc. of wire 16.

Furthermore, in the first exemplary embodiment, the welding current is reduced sharply within a short period of time (about 2 msec) from opening of the shorting at time T6 so as to ease controlling of the shape at the tip end of wire 16.

Accordingly, duration of predetermined welding-current time t2 is timed beginning from time T6.

Referring to FIG. 1 here, description is provided of an arc welding apparatus of the consumable electrode type for carrying out arc-welding control as discussed above. In FIG. 1, welding start dictator 12 sends a welding end signal to output controller 11 and wire feeding speed controller 13 for turning off the welding power output. Wire feeding speed controller 13 accelerates the wire feeding speed according to the predetermined cycle and amplitude, and decelerates thereafter. It then retracts wire 16 backward at predetermined retracting speed Wf1 for the predetermined duration of retracting time t4, and stops the retracting motion of wire 16.

Wire feeding speed controller 13 controls the wire feeding speed by sending a signal for controlling the wire feeding speed to wire feeder 19. In this instance, the waveform for changing the wire feeding speed may be of a sinusoidal shape having predetermined cycle and amplitude as shown in FIG. 2, or it can be changed to a waveform of trapezoidal shape.

Wire feeding speed controller 13 is provided with storage device 21 and wire feeding speed decision section 22. Here, storage device 21 stores relational formulas or a table (data chart), which coordinate such parameters as a setting current, an average value of wire feeding speed, a cyclic period (frequency) of the wire feeding speed, an amplitude of the wire feeding speed, backward retraction time t4 and the like. Wire feeding speed decision section 22 decides an average wire feeding speed, a frequency and an amplitude of the wire feeding speed retrieved from storage device 21 based on the current set by welding condition setting section 23. Wire feeding speed controller 13 receives outputs of short/arc detector 10 and wire feeding speed decision section 22, and controls the wire feeding speed by periodically repeating it forward and backward.

On the other hand, control of the welding power output given by the welding current and welding voltage is carried out in the following manner. Output controller 11 outputs a signal for controlling any of the welding current and the welding voltage by using an appropriate parameter for a shorting period, for instance if it is in the shorting period, corresponding to the welding waveform parameter selected according to the welding current and the welding voltage set by welding condition setting section 23. Or, it outputs another signal for controlling any of the welding current and the welding voltage by using an appropriate parameter for an arcing period if it is in the arcing period. Any of these output signals is input to switching element 4 to control the welding power output. When welding start dictator 12 inputs a welding end signal to output controller 11 for turning off the welding operation, short/arc detector 10 outputs a signal of open-shorting when the shorting is opened at time T6. Output controller 11 operates in a manner to output a predetermined value of constant welding current A1 for a predetermined duration of welding-current time t2 starting from time T6, to control the size of the tip end of wire 16.

As discussed, the arc welding apparatus in the first exemplary embodiment of the present invention is the consumable electrode type used for welding by generating arc 17 between welding wire 16 serving as a consumable electrode and base metal 15 as an object to be welded. The arc welding apparatus comprises welding condition setting section 23, switching element 4, welding voltage detector 9, welding start dictator 12, short/arc detector 10, output controller 11, storage device 21, wire feeding speed decision section 22 and wire feeding speed controller 13. Wire feeding speed controller 13 of this arc welding apparatus accelerates wire 16 according to the predetermined cycle and amplitude to make shorting between wire 16 and base metal 15 when a welding end signal is input while arc 17 is being generated. It then retracts wire 16 backward according to predetermined cycle and amplitude until the wire retracting speed reaches a predetermined rate, and continues the backward retraction thereafter by controlling the wire retracting speed constant at the predetermined rate for a predetermined duration of time. After the retracting motion of wire 16 is stopped, output controller 11 terminates the welding power output after supplying the welding current of a predetermined amount for a predetermined duration of welding time starting from the point of time when opening of the shorting occurs during the backward retraction of wire 16.

These operations can ensure a proper distance between the tip end of the wire and the base metal even when the tip end of wire 16 has a small shape so as to avoid sticking and prevent the tip end of wire 16 from coming in contact with the molten metal pool after the termination of the welding power output. Accordingly, it becomes possible to obtain the shape at the tip end of wire 16 without variations, and the sufficient distance between the tip end of wire 16 and the base metal 15 to prevent them from becoming welded together, thereby avoiding interruption of the manufacturing operation.

In the arc welding apparatus of the first exemplary embodiment of this invention, the acceleration of wire 16 is carried out according to the predetermined cycle and amplitude, and the backward retraction of welding wire 16 is also carried out according to the predetermined cycle and amplitude. It is by virtue of this method that enables wire 16 to become shorted reliably by the acceleration, and helps start the subsequent backward retraction of wire 16 quickly to obtain the distance between the tip end of the wire and the base metal in a short period of time, when there is an average distance of at least 1 mm between the tip end of the wire and the molten metal pool in the case of welding with a current range of 200 A or larger having shorting occurring irregularly and frequency of the shorting being about 80 times or less per minute.

With regard to the time required to end the welding, the embodied method can complete the ending process by shorting only once as compared to 100 msec to 200 msec needed to end the welding in the example of the conventional control method described in the background art. The above method can shorten the time necessary to end the welding to about 30 msec to 50 msec, and it can hence reduce the production cycle time and improve productivity.

What has been shown in this first exemplary embodiment is an example, in which wire 16 is fed and accelerated periodically when the welding end signal is input during the arcing period. However, wire feeding speed controller 13 does not accelerate wire 16 until the shorting is opened when the welding end signal is input while in the period of shorting. It is acceptable for wire feeding speed controller 13 to feed and accelerate wire 16 periodically according to the predetermined cycle and amplitude and to cause shorting of wire 16 with base metal 15 after the previous shorting is opened. In the case of welding with a current range of 200 A or smaller having shorting occurring regularly and frequency of the shorting being as high as about 80 to 100 times per minute, there is a short average distance of about 1 mm or less between the tip end of the wire and the molten metal pool. Therefore, it rather results in a longer time needed to open the shorting because wire 16 is thrust into the molten metal pool when wire 16 is accelerated to force the shorting upon receiving an input of the welding end signal. Accordingly, the shorting can occur quickly enough even when wire 16 is not accelerated, so that the subsequent backward retraction of wire 16 can be started quickly to obtain the distance between the tip end of the wire and the base metal in a short period of time by simply shorting wire 16 without acceleration.

The first exemplary embodiment discussed here is an example, in which feeding of wire 16 after the input of a welding end signal is carried out periodically (there may be cases of less than one cycle) according to the predetermined cycle (frequency) and amplitude. Instead of limiting the feeding method as to be periodical, however, it is also appropriate to control the feeding of wire 16 in such a manner that wire 16 is accelerated upon input of the welding end signal to short it with base metal 15, and after the shorting, wire 16 is retracted backward to open the shorting between wire 16 and base metal 15.

Second Exemplary Embodiment

In this second exemplary embodiment, like reference marks are used to designate like structural components as those of the first exemplary embodiment, and details of them will be omitted while description will cover only different items. A main point of difference from the first exemplary embodiment is that the wire feeding speed is decelerated at a predetermined inclination from a point of time when a signal for turning off the welding power output is input. Another point of difference is that wire 16 is retracted backward for a predetermined duration of time, starting from a point when shorting occurs for the first time following the input of the signal for turning off the welding power output, or a welding end signal, so as to open the shorting and pull up wire 16 to end the welding.

There is also an alternative method as follows, instead of decelerating the wire feeding speed at the predetermined inclination from the time when the signal for turning off the welding power output is input. That is, the wire feeding speed in the forward motion is kept unchanged rather than decelerated, and the backward retraction of wire 16 is then started from the point when the first shorting occurs following the input of the signal for turning off the welding power output.

Figure 3:
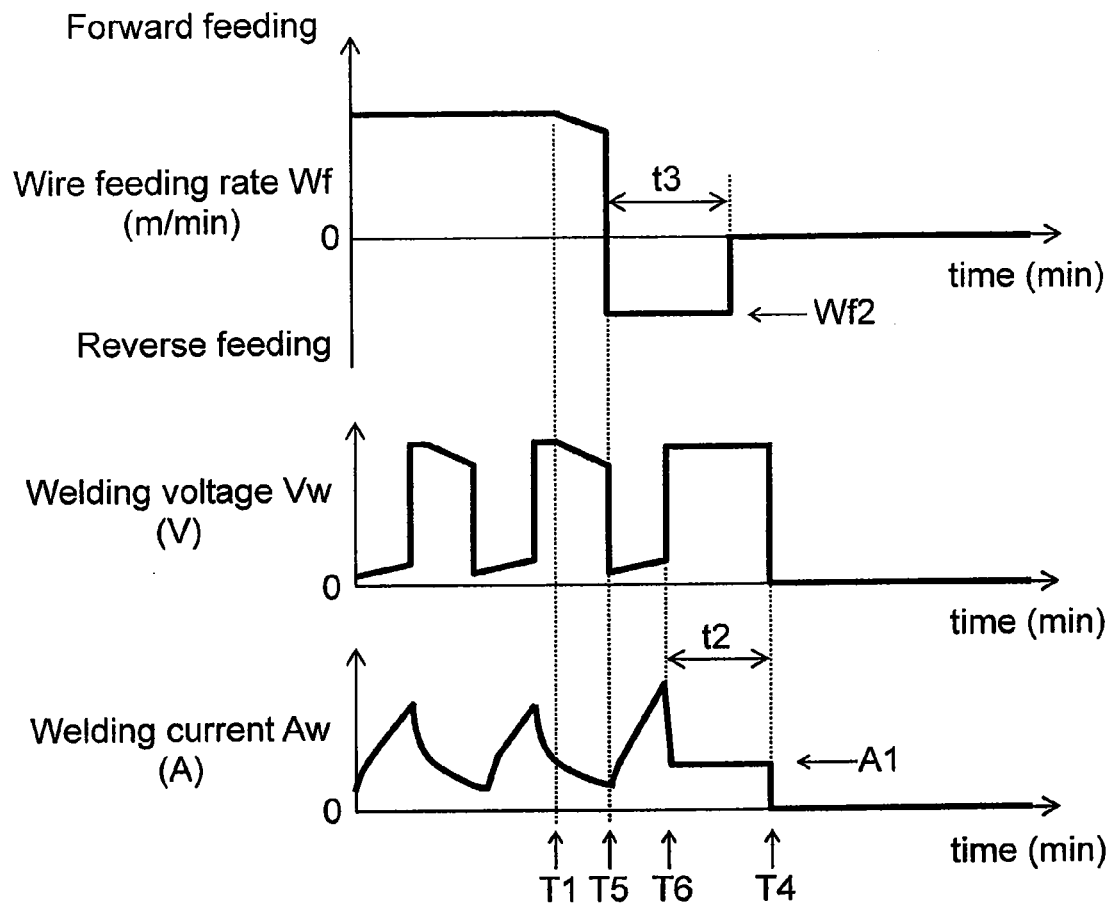
FIG. 3 is another graphic representation illustrating waveforms of wire feeding speed, welding voltage and welding current according to a second exemplary embodiment of the present invention.
Figure 4:
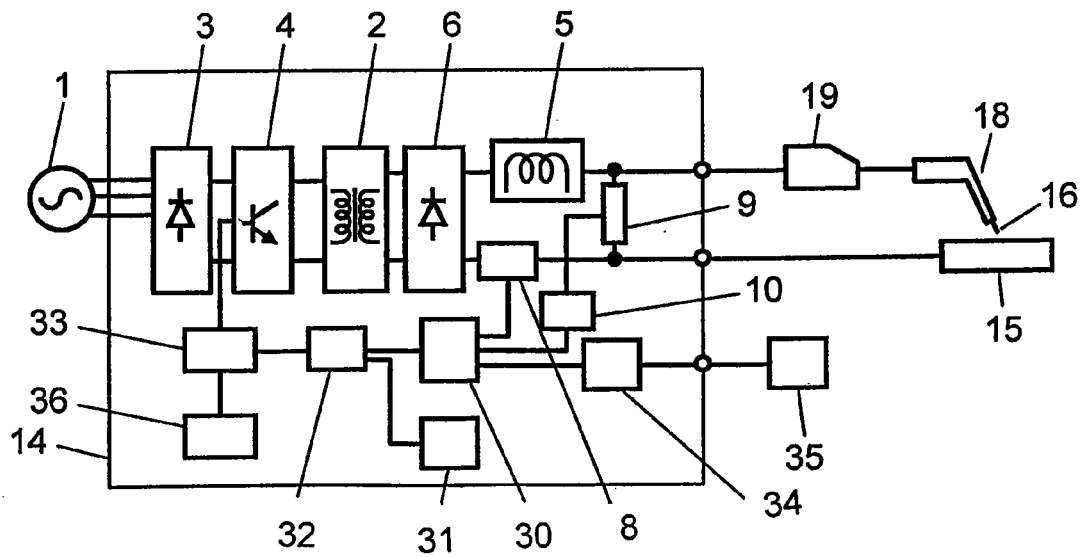
FIG. 4 is a schematic diagram showing a general structure of a conventional arc welding apparatus.
Figure 5:
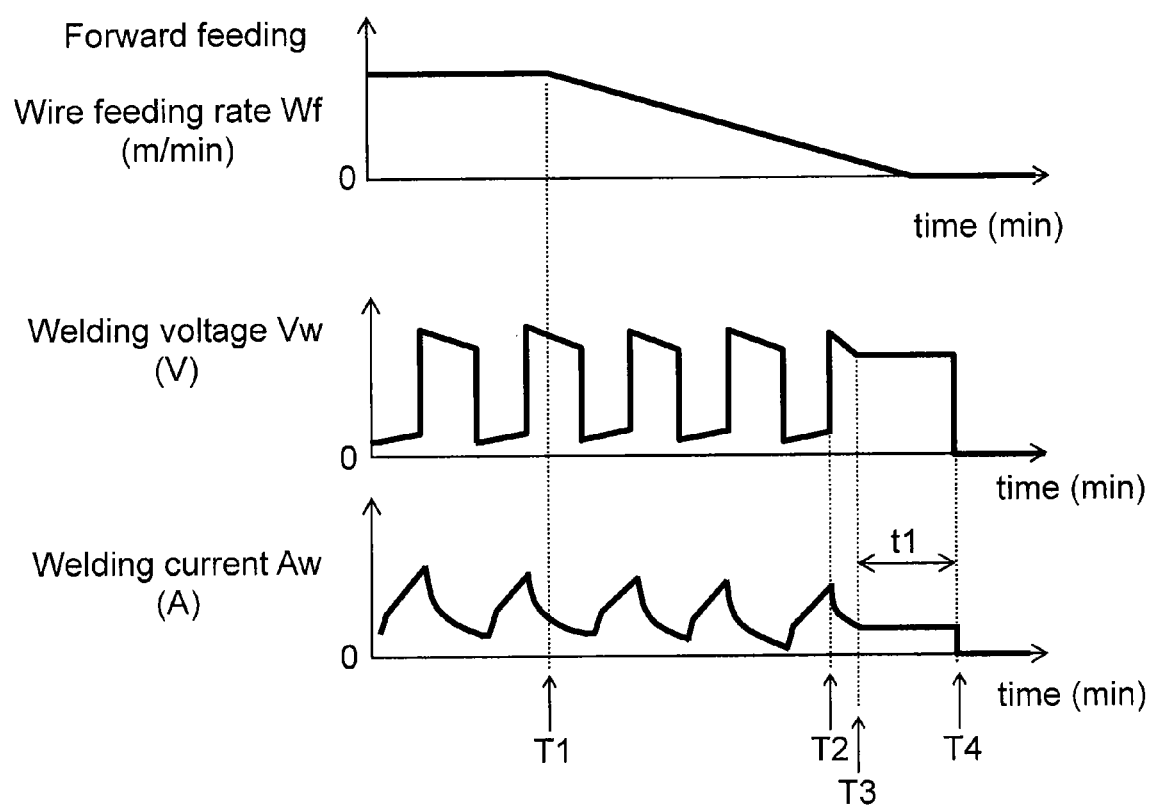
FIG. 5 is a graphic representation illustrating waveforms of wire feeding speed, welding voltage and welding current in a process of arc welding with the conventional arc welding apparatus.

FIG. 3 is a graphic representation illustrating waveforms of wire feeding speed, welding voltage and welding current according to the second exemplary embodiment of this invention.

Time T1 shown in FIG. 3 is a time when the signal for turning off the welding power output is input, and upon which a control process is commenced for wire feeding speed Wf, welding current Aw and welding voltage Vw in order to end the welding.

Wire feeding speed Wf is decelerated at the predetermined inclination toward welding speed of 0 until the first shorting occurs. The wire feeding speed is changed to begin the backward retraction when the first shorting occurs at time T5 following the input of the signal for turning off the welding power output. Wire 16 is then retracted backward at a constant rate of predetermined wire retracting speed Wf2 for a predetermined duration of time t3, and the retracting motion of wire 16 stopped thereafter to ensure a sufficient distance (about 3 mm to 8 mm) between the tip end of the wire and the base metal. Here, predetermined wire retracting speed Wf2 is roughly 1 m/min to 20 m/min, and predetermined retracting time t3 is roughly 10 msec to 30 msec.

Since the shorting opens at time T6 during the backward retraction, a predetermined value of constant welding current A1 (about 30 A to 100 A) is output for a predetermined duration of welding-current time t2 starting from time T6 to melt wire 16 and control the shape of a globule formed at the tip end of wire 16. Since the flow of welding current melts the tip end of wire 16, it increases the distance between the tip end of the wire and the base metal. This causes the distance between the tip end of the wire and the base metal to become larger than 3 mm to 8 mm, which is the distance provided by the backward retraction of wire 16.

In this second exemplary embodiment, the time to stop the wire feeding speed is shown as not to coincide with the time to terminate the welding power output, as such that the termination of the welding power output is set later than the stop time of the wire feeding speed. However, they can be set to coincide with each other, or the termination of the welding power output may be set earlier than the other.

Furthermore, in the second exemplary embodiment, the welding current is reduced sharply within a short period of time (about 2 msec) from time T6 so as to ease controlling of the shape of the tip end of wire 16, and a duration of predetermined time t2 is timed beginning from time T6.

Referring now to FIG. 1, description is provided of an arc welding apparatus of the consumable electrode type for carrying out arc-welding control as discussed above. In FIG. 1, welding start dictator 12 sends a welding end signal to output controller 11 and wire feeding speed controller 13 for turning off the welding power output. Wire feeding speed controller 13 decreases the wire feeding speed at the predetermined inclination of deceleration toward welding speed of 0 until the first shorting occurs following the input of the signal for turning off the welding power output. In this embodiment here, the predetermined inclination of decelerating the wire feeding speed is about 0.5 m/sec$^2$ to 2 m/sec$^2$.

When wire feeding speed controller 13 receives an input from short/arc detector 10, indicating occurrence of the first shorting following the input of the welding end signal, it starts the backward retracting motion at predetermined wire retracting speed Wf2. It retracts wire 16 backward by maintaining predetermined retracting speed Wf2 for the predetermined duration of retracting time t3, and stops the retracting motion of wire 16. Wire feeding speed controller 13 controls the wire feeding speed by sending a signal for controlling the wire feeding speed to wire feeder 19. The waveform for the wire feeding speed may be of any shape such as changing it sharply to another speed like the wire retracting speed Wf1 shown in FIG. 2, changing it like a half cycle of sinusoidal shape, or it may be changed to a waveform of trapezoidal shape.

Wire feeding speed controller 13 is provided with storage device 21 and wire feeding speed decision section 22. Here, storage device 21 stores relational formulas or a table (data chart) that coordinate such parameters as a setting current or an average value of wire feeding speed, a predetermined inclination of decelerating the wire feeding speed following the input of the signal for turning off the welding power output, predetermined welding current time t2, backward retracting time t3 and the like. Wire feeding speed decision section 22 decides such parameters as an inclination of decelerating the wire feeding speed following input of a welding end signal from storage device 21, predetermined welding current time t2, backward retracting time t3 and the like according to a current value set by welding condition setting section 23.

On the other hand, control of the welding power output given by the welding current and welding voltage is carried out in the following manner. Output controller 11 outputs a signal for controlling any of the welding current and the welding voltage by using an appropriate parameter for a shorting period, for instance if it is in the shorting period, corresponding to the welding waveform parameter selected according to the welding current and the welding voltage set by welding condition setting section 23. Or, it outputs another signal for controlling any of the welding current and the welding voltage by using an appropriate parameter for an arcing period if it is in the arcing period. Any of these output signals is input to switching element 4 to control the welding power output.

When welding start dictator 12 outputs to output controller 11 a welding end signal for turning off the welding operation, and the first shorting is opened, short/arc detector 10 outputs a signal of open-shorting. Output controller 11 then operates in a manner to output a predetermined value of constant welding current A1 for a predetermined duration of welding-current time t2 after opening of the shorting in order to control the size of the tip end of wire 16.

As discussed, the arc welding apparatus in the second exemplary embodiment of this invention is the consumable electrode type used for welding by generating arc 17 between welding wire 16 serving as a consumable electrode and base metal 15 as an object to be welded. The arc welding apparatus comprises welding condition setting section 23, switching element 4, welding voltage detector 9, welding start dictator 12, short/arc detector 10, output controller 11, storage device 21, wire feeding speed decision section 22 and wire feeding speed controller 13. In this arc welding apparatus, wire feeding speed controller 13 continues to feed wire 16 forward at the same feeding speed until sorting between wire 16 and base metal 15 occurs for the first time after the welding end signal is input while arc 17 is being generated. Or, it decelerates the feeding speed of wire 16 at a predetermined rate from the previous forward feeding speed. When the first shorting occurs after the input of the welding end signal, wire feeding speed controller 13 starts backward retraction of wire 16 at a predetermined retracting speed for a predetermined duration of time. After that, wire feeding speed controller 13 stops the feeding/retracting motion of wire 16. Output controller 11 terminates the welding power output after supplying the welding current of a predetermined amount for a predetermined duration of welding time starting from the point of time when opening of the shorting occurs during the retracting motion of wire 16.

These operations can ensure a shape of proper size at the tip end of wire 16 without variations, and a sufficient distance between the tip end of wire 16 and the base metal 15 to prevent them from becoming welded together, thereby avoiding interruption of the manufacturing operation. With regard to the time required to end the welding, the embodied method can complete the ending process by shorting only once as compared to 100 msec to 200 msec needed to end the welding in the example of the conventional control method described in the background art. The above method can shorten the time necessary to end the welding to about 30 msec to 50 msec, and it can hence reduce the production cycle time and improve productivity.

Although the method discussed in this second exemplary embodiment is of the case, in which the welding end signal is input during the period of arcing, it is also appropriate to let the backward retraction of wire 16 start at the time of receiving the welding end signal if it is input during the shorting period. Accordingly, it becomes possible to ensure the distance between the tip end of the wire and the base metal in a short period of time because the backward retraction is started immediately after input of the signal during the shorting period.

INDUSTRIAL APPLICABILITY

According to the present invention, the method and the apparatus are useful for industrial applications for arc welding with a welding wire of consumable electrode being fed continuously.

REFERENCE MARKS IN THE DRAWINGS

1 Mains power source
2 Main power transformer
3 Primary rectifier element
4 Switching element
5 Reactor
6 Secondary rectifier element
8 Welding current detector
9 Welding voltage detector
10 Short/arc detector
11 Output controller
12 Welding start dictator
13 Wire feeding speed controller
14 Welding power unit
15 Base metal
16 Wire
17 Arc
18 Torch
19 Wire feeder
20 Tip
21 Storage device
22 Wire feeding speed decision section
23 Welding condition setting section

The invention claimed is:

1. An arc welding process comprising:
a first step of welding with a consumable welding wire at a constant wire feeding speed generated by a wire feeding speed controller in which a welding current generated by a power output controller flows;
a second step of inputting a signal to end welding comprising an instruction generated by a welding start dictator to stop the arc welding process to at least one of the welding power output controller and the wire feeding speed controller after the first step;
a third step, after the second step, of retracting the consumable welding wire at a constant wire retracting speed controlled by the wire feeding speed controller for a first predetermined time and then stopping the retracting of the consumable welding wire;
a fourth step, after the second step, of supplying a constant welding current generated by the welding power output controller for a second predetermined time and then stopping the supplying the constant welding current, wherein the fourth step starts after the third step starts; and
a fifth step, after the third and fourth steps, of terminating welding power with the welding power output controller.

2. The arc welding method of claim 1 further comprising:
a sixth step, after the second step and before the third step, of accelerating a wire feeding speed and decelerating the wire feeding speed to reach the constant wire retracting speed, 3. The arc welding method of claim 2, wherein
the accelerating and the decelerating of the wire feeding speed is carried out according to a predetermined cycle and a predetermined amplitude.

4. The arc welding method of claim 2, wherein
when the second step is performed in an arc state,
the sixth step starts immediately after the second step, and
when the second step is performed in a short-circuit state, the sixth step starts when the short-circuit is opened.

5. The arc welding method of claim 1, wherein
when the second step is performed in an arc state, the wire feeding speed is decelerated at a predetermined inclination immediately after the second step, and the third step starts when the arc state ends and short-circuit state starts.

6. The arc welding method of claim 1, wherein when the second step is performed in a short circuit state, the third step starts immediately after the second step.

7. The arc welding method of claim 1, wherein when the second step is performed in an arc state, the wire feeding speed is kept at the constant wire feeding speed, and
the third step starts when the arc state ends and next short-circuit state starts.

8. The arc welding method of claim 1, wherein the fourth step ends later than the third step ends.

9. The arc welding method of claim 1, wherein the fourth step and the third step end simultaneously.

10. The arc welding method of claim 1, further comprising:
a seventh step of selecting a size of a tip end of the consumable welding wire; and
an eighth step of setting the constant welding current and the first predetermined time based on the selected size of the tip end.

11. An arc welding apparatus of consumable electrode type used for welding by generating arc between a welding wire serving as a consumable welding wire and a base metal as an object to be welded, the apparatus comprising:
a welding condition setting section for setting a welding condition;
a switching element for regulating a welding power output;
a welding voltage detector for detecting a welding voltage;
a welding start dictator for giving a command of starting or stopping the welding power output;
a short/arc detector for detecting whether a welding condition between the consumable welding wire and the base metal is in a short-circuit mode or in an arcing mode according to an output of the welding voltage detector;
a welding output controller for controlling the switching element in a manner to produce any of predetermined current waveform and voltage waveform according to a given current set in the welding condition setting section and an output of the short/arc detector;
a storage device for storing the set current and a wire feeding speed of the consumable welding wire used after a signal to end welding is input in a coordinated fashion;
a wire feeding speed decision section for deciding the wire feeding speed retrieved from the storage device based on the set current; and
a wire feeding speed controller for receiving the output of the short/arc detector and an output of the wire feeding speed decision section, and controlling the wire feeding speed, wherein
an arc welding process is performed with the consumable welding wire at a constant wire feeding speed generated by the wire feeding speed controller in which a welding current generated by the welding power output controller flows;
the arc welding process is stopped by an instruction generated by the welding start dictator to stop at least one of the welding power output controller and the wire feeding speed controller;
the consumable welding wire is retracted at a constant wire retracting speed controlled by the wire feeding speed controller for a first predetermined time and then stopped;
a constant welding current is supplied for a second predetermined time and then stopped; and
the welding power output is terminated by the welding power output controller.

12. The arc welding apparatus of claim 11, wherein the wire feeding speed is accelerated and decelerated by the wire feeding speed controller to reach the constant wire retracting speed.

13. The arc welding apparatus of claim 12, wherein the accelerating and the decelerating of the wire feeding speed is carried out according to a predetermined cycle and a predetermined amplitude.

14. The arc welding apparatus of claim 12, wherein when stopping of the arc welding process is performed in an arc state,
the accelerating and the decelerating starts immediately after the arc welding process is stopped, and
when the stopping of the arc welding process is performed in a short-circuit state, the accelerating and the decelerating starts when the short-circuit is opened.

15. The arc welding apparatus of claim 11, wherein when the stopping of the arc welding process is performed in an arc state, the wire feeding speed is decelerated at a predetermined inclination immediately after the stop, and
the retraction of the consumable welding wire starts when the arc state ends and short-circuit state starts.

16. The arc welding apparatus of claim 11, wherein when the stopping of the arc welding process is performed in a short circuit state, the retraction of the consumable welding wire starts immediately after the stop.

17. The arc welding apparatus of claim 11, wherein when the stopping of the arc welding process is performed in an arc state, the wire feeding speed is kept at the constant wire feeding speed, and
the retraction of the consumable welding wire starts when the arc state ends and next short-circuit state starts.

18. The arc welding apparatus of claim 11, wherein the supplying of the constant welding current ends later than the retraction of the consumable welding wire ends.

19. The arc welding apparatus of claim 11, wherein the supplying of the constant welding current and the retraction of the consumable welding wire end simultaneously.

20. The arc welding apparatus of claim 11, wherein a size of a tip end of the consumable welding wire is selected; and
the constant welding current and the first predetermined time are set based on the selected size of the tip end.

* * * * *